United States Patent
Okuda et al.

(10) Patent No.: US 9,834,213 B2
(45) Date of Patent: Dec. 5, 2017

(54) LANE KEEPING ASSIST APPARATUS

(71) Applicant: TOYOTA JIDOSHA KABUSHIKI KAISHA, Toyota-shi, Aichi (JP)

(72) Inventors: Yuji Okuda, Toyota (JP); Hidenobu Kinugasa, Nagoya (JP); Taisuke Hasegawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 2 days.

(21) Appl. No.: 14/896,217

(22) PCT Filed: Jul. 1, 2014

(86) PCT No.: PCT/JP2014/067999
§ 371 (c)(1),
(2) Date: Dec. 4, 2015

(87) PCT Pub. No.: WO2015/012091
PCT Pub. Date: Jan. 29, 2015

(65) Prior Publication Data
US 2016/0137201 A1 May 19, 2016

(30) Foreign Application Priority Data
Jul. 22, 2013 (JP) ................................ 2013-151948

(51) Int. Cl.
*B60W 30/12* (2006.01)
*B60W 10/18* (2012.01)
(Continued)

(52) U.S. Cl.
CPC ............ *B60W 30/12* (2013.01); *B60W 10/18* (2013.01); *B60W 10/20* (2013.01);
(Continued)

(58) Field of Classification Search
CPC combination set(s) only.
See application file for complete search history.

(56) References Cited

U.S. PATENT DOCUMENTS

2005/0267684 A1* 12/2005 Kawakami ........... B62D 15/026
701/301
2008/0243327 A1* 10/2008 Bujak .................... B60W 30/12
701/33.7

(Continued)

FOREIGN PATENT DOCUMENTS

JP 2001-273597 A 10/2001
JP 2005-343259 A 12/2005
(Continued)

*Primary Examiner* — Thomas G Black
*Assistant Examiner* — Ana Thomas
(74) *Attorney, Agent, or Firm* — Oliff PLC

(57) ABSTRACT

A lane keeping assist apparatus is disclosed which includes a lane detecting part; an information output device; an actuator that generates a force for changing an orientation of a vehicle; and a controller that performs a lane keeping assist control based on a positional relationship between the lane and the vehicle, wherein the lane keeping assist control includes an alert control and an intervention control via the actuator, the controller selectively operates in a first mode where the alert control and the intervention control are executable, a second mode where only the intervention control is suppressed or a third mode where the alert control and the intervention control are suppressed, and the controller, during operating in the first mode, performs a mode transition to the second mode when the abnormality determination results indicate an abnormal state concerning only the part related to the intervention control.

11 Claims, 6 Drawing Sheets

(51) Int. Cl.
　　　*B60W 10/20*　　　(2006.01)
　　　*B60W 30/182*　　(2012.01)
　　　*B60W 50/14*　　　(2012.01)

(52) U.S. Cl.
　　　CPC ..... *B60W 30/182* (2013.01); *B60W 2050/143* (2013.01); *B60W 2420/42* (2013.01); *B60W 2520/10* (2013.01); *B60W 2520/14* (2013.01); *B60W 2520/28* (2013.01); *B60W 2550/22* (2013.01); *B60W 2710/18* (2013.01); *B60W 2710/20* (2013.01); *B60W 2710/202* (2013.01)

(56) References Cited

U.S. PATENT DOCUMENTS

2010/0182139 A1 * 7/2010 Chen .................... B60W 30/12
　　　　　　　　　　　　　　　　　　　　　340/435
2012/0072097 A1　　3/2012　Ohta et al.

FOREIGN PATENT DOCUMENTS

| JP | 2008012989 A | * | 7/2006 | ............... B62D 6/00 |
| JP | 2008-012989 A |  | 1/2008 |  |
| JP | 2010-228591 A |  | 10/2010 |  |
| JP | 2011-001049 A |  | 1/2011 |  |
| JP | 2012-176643 A |  | 9/2012 |  |

* cited by examiner

FIG.2
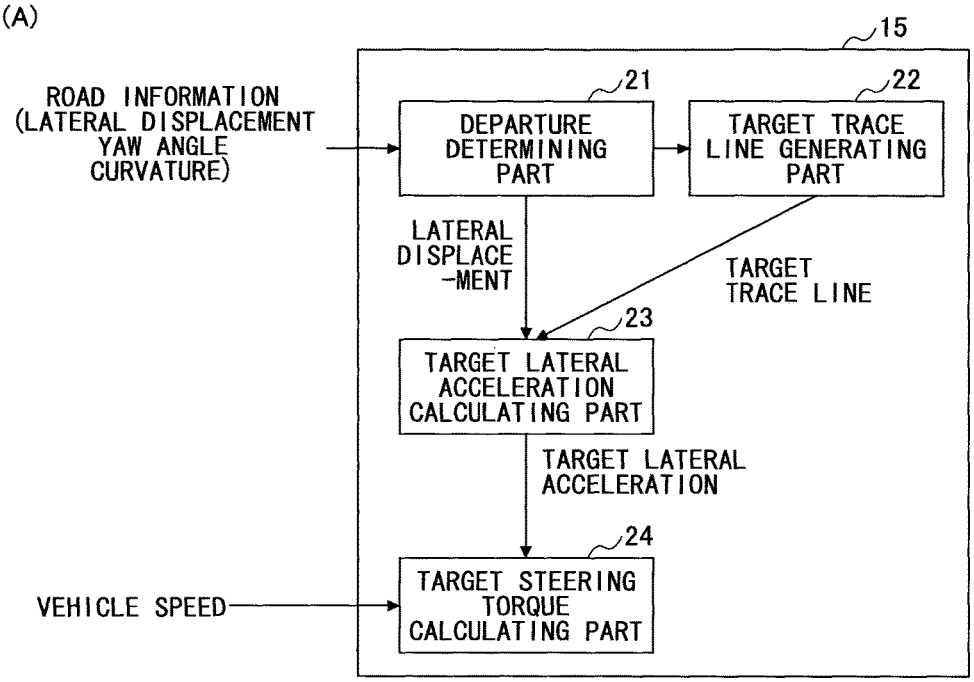
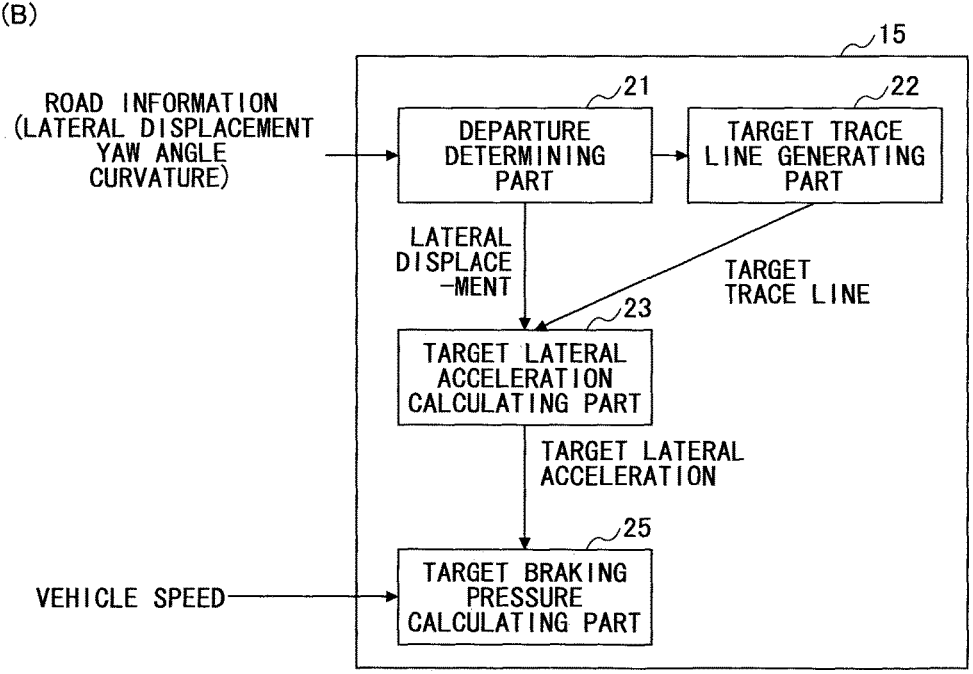

FIG.3

| | | ABNORMALITY DETERMINATION RESULT | | |
|---|---|---|---|---|
| | | NORMAL STATE | FIRST ABNORMAL STATE | SECOND ABNORMAL STATE |
| OPERATION MODE | A-MODE (INTERVENTION CONTROL + ALERT CONTROL) | AN | AI | AM |
| | B-MODE (INTERVENTION CONTROL ONLY) | BN | BI | BM |
| | C-MODE (ALERT CONTROL ONLY) | CN | CI | CM |
| | D-MODE (INTERVENTION CONTROL AND ALERT CONTROL ARE IN NON-OPERATED STATE) | DN | DI | DM |

LANE KEEPING ASSIST APPARATUS

TECHNICAL FIELD

The disclosure is related to a lane keeping assist apparatus.

BACKGROUND ART

A controller for a vehicle is known which performs only a lane deviation alarm function based on an image picked-up by a CCD camera when an information not-obtainable state in a magnetic nail sensor occurs under a situation where the lane deviation alarm function for informing that a host vehicle is deviated from a traveling lane and a steering control function for preventing or suppressing the deviation are performed based on the magnitude of magnetism detected by the a magnetic nail sensor.

[Patent Document 1] Japanese Laid-open Patent Publication No. 2001-273597

DISCLOSURE OF INVENTION

Problem to be Solved by Invention

However, according to a configuration disclosed in Patent Document 1, two types of lane detecting parts, that is to say, the magnetic nail sensor and the CCD camera, are necessary to ensure redundancy, which increases cost. Further, Patent Document 1 fails to disclose a process for a case where an abnormality of other parts related to the steering control function (actuators of a steering mechanism and a brake mechanism, for example) under a situation where the magnetic nail sensor is normal.

Therefore, an object of this disclosure is to provide a lane keeping assist apparatus that can partially keep a lane keeping assist function if an abnormality in a relevant part other than a lane detecting part, etc., is detected.

Means to Solve the Problem

According to one aspect of the disclosure, a lane keeping assist apparatus is provided, which includes:

a lane detecting part that detects a lane in which a vehicle travels;

an information output device;

an actuator that generates a force for changing an orientation of the vehicle; and a controller that performs a lane keeping assist control based on a positional relationship between the lane detected by the lane detecting part and the vehicle under a situation where a lane keeping assist function is in its ON state, wherein the lane keeping assist control includes an alert control for outputting an alert via the information output device and an intervention control for changing an orientation of the vehicle via the actuator, the controller selectively operates in a first mode where the alert control and the intervention control are executable, a second mode where only the intervention control, among the alert control and the intervention control, is suppressed or a third mode where the alert control and the intervention control are suppressed, according to abnormality determination results about a part related to the alert control and a part related to the intervention control, and the controller, during operating in the first mode, performs a mode transition to the second mode when the abnormality determination results indicate an abnormal state concerning only the part related to the intervention control, among the part related to the alert control and the part related to the intervention control.

Advantage of the Invention

According to one aspect of the disclosure, a lane keeping assist apparatus can be obtained which can partially keep a lane keeping assist function if an abnormality in a relevant part other than a lane detecting part, etc., is detected.

BRIEF DESCRIPTION OF DRAWINGS

FIG. 2 (A) is a block diagram for illustrating an example of a controller 15 when it performs an intervention control with a steering torque (steering force), and FIG. 2 (B) is a block diagram for illustrating an example of the controller 15 when it performs the intervention control with a braking force.

FIG. 3 is a table for illustrating an example of a relationship between an operation mode of the controller 15 and abnormality determination results.

Figure 1:
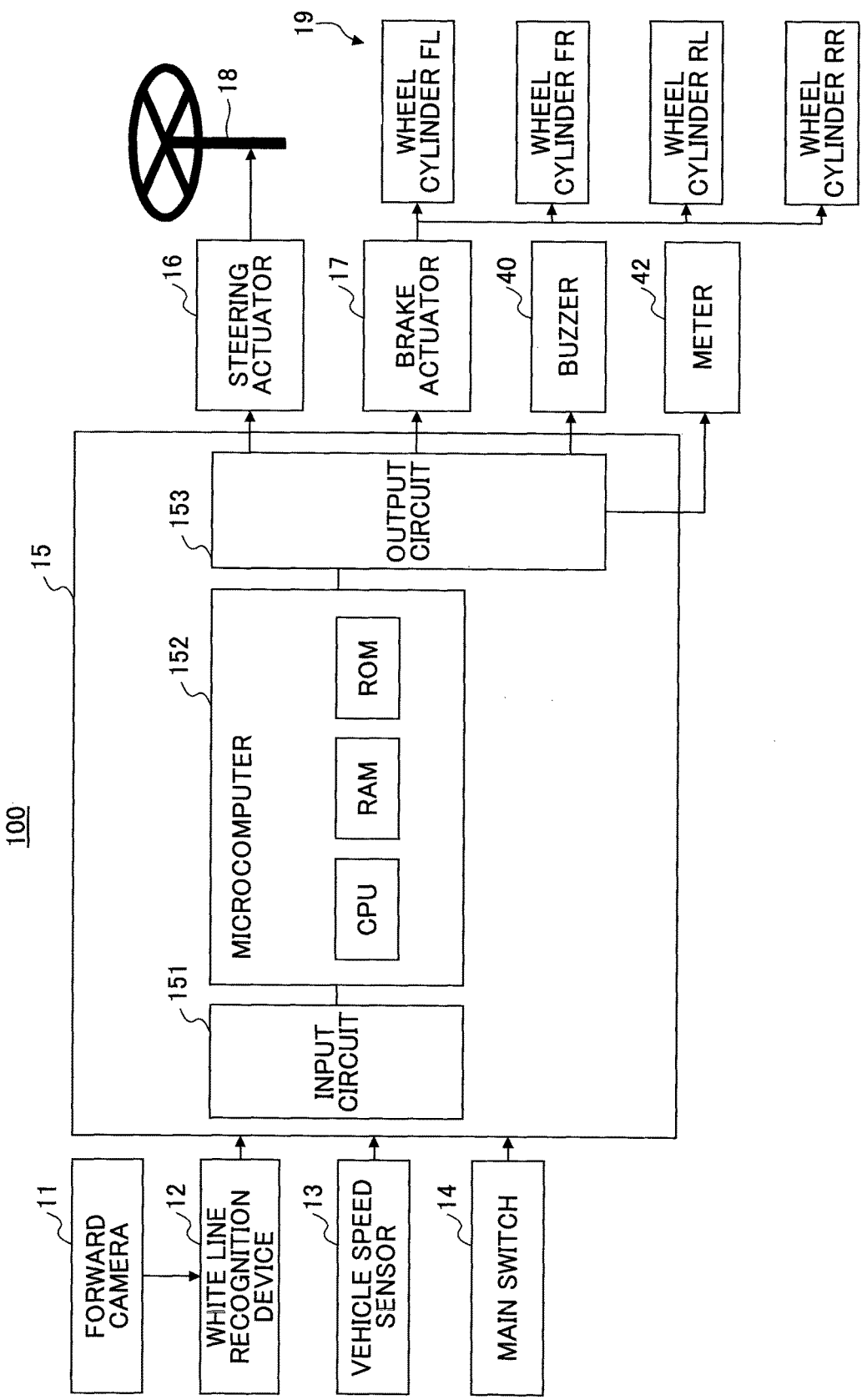
FIG. 1 is a diagram for schematically illustrating a configuration of a lane keeping assist apparatus according to an embodiment.

DESCRIPTION OF REFERENCE SYMBOLS 11 forward camera
12 white line recognition device
14 main switch
15 controller
16 steering actuator
17 brake actuator
18 steering shaft
100 lane keeping assist apparatus

BEST MODE FOR CARRYING OUT THE INVENTION

In the following, embodiments are described in detail with reference to appended drawings.

FIG. 1 is a diagram for schematically illustrating a configuration of a lane keeping assist apparatus 100 according to an embodiment. In the example illustrated in FIG. 1, the lane keeping assist apparatus 100 includes a forward camera 11, a white line recognition device 12, a vehicle speed sensor 13, a main switch 14, a controller 15, a steering actuator 16, a brake actuator 17, a buzzer 40 and a meter 42.

The forward camera 11 may be a single camera or a stereo camera that captures a scene around the vehicle that mainly includes a predetermined region in front of the vehicle. Photoelectric conversion elements of the forward camera 11 may be CCDs (charge-coupled devices), CMOSs (complementary metal oxide semiconductors), etc. The forward camera 11 outputs image data, which is obtained by capturing the scene in front of the host vehicle, to the white line recognition device 12. The operation for capturing the scene in front of the host vehicle may be performed periodically at a predetermined frame rate (30 through 60 frames per sec, for example).

The white line recognition device 12 may recognize a lane boundary sign from the image data to calculate road information. The lane boundary sign represents a road surface sign for delimiting (defining) a traveling lane. For example, the lane boundary sign is a line-shaped sign formed by applying paint which can be recognized from a road surface, such as white paint, in line shape along the road. Further, there is a white line formed in a chromatic color such as yellow or orange, depending on a road rule or a nation. Further, the lane boundary sign includes, in addition to a line-shaped sign, a dotted line or a broken line which has portions in which paint is not applied at a predetermined interval. Further, when the traveling lane is delimited by a three-dimensional object such as a bots dots such as in United State of America, instead of the paint, such a three-dimensional object is also included in the lane boundary sign. Further, when the traveling lane is delimited by arranging light emitting objects such as lamps or cat's eye along the road, these objects are also included in the lane boundary sign.

Further, the road information may include an angle (yaw angle) $\phi$ between a direction of the traveling lane of the vehicle and a forward and backward direction of the vehicle; a lateral displacement X from the center of the traveling lane to the center of the vehicle; and a curvature $\beta$ of the traveling lane. The white line recognition device 12 outputs the road information, which is calculated from the image data, to the controller 15. It is noted that curvature $\beta$ of the traveling lane may be derived by scanning luminance information in a horizontal direction on a predetermined interval basis of the imaged data in the vertical direction, detecting horizontal edges with strength greater than a predetermined value, and applying curve fitting (a least squares method or the like) to positions of the detected edges. It is noted that a part or all of functions of the white line recognition device 12 may be implemented by the control calculating part 15.

The wheel speed sensor 13 may detect respective wheel speeds of a left front wheel FL, a right front wheel FR, a left rear wheel RL and a right rear wheel RR. The controller 15 may adopt an average of two wheel speeds of the driven wheels, among the respective wheel speeds of the wheels, as a vehicle speed of the vehicle. It is noted that the vehicle speed may be calculated based on a rpm of an output shaft of a transmission, a history of vehicle position measurements from a GNSS (global navigation satellite system) receiver, etc.

The main switch 14 is to be operated by a user. The main switch 34 may be provided at any location in a cabin. The main switch 14 may be a mechanical switch or a touch switch. The main switch 14 is an interface with which the user input an intention whether to perform the lane keeping assist control described hereinafter to the lane keeping assist apparatus 100. As an example, it is assumed hereinafter that the main switch 14 is turned on when the user expresses an intention to perform the lane keeping assist control. It is noted that a display for informing an ON/OFF status of the main switch 14 (i.e., an ON/OFF status of the lane keeping assist control) may be output in a meter 42.

The steering actuator 16 may include an arbitrary configuration for generating the steering torque (steering force). The steering actuator 16 may be a motor that is used for an assist control for adding an assist torque in the steering direction of the driver. For example, the steering actuator 16 may be provided in a steering gear box such that the steering actuator 16 is coaxial with a steering rack (not illustrated). In this case, the steering actuator 16 may be engaged with the steering rack via a ball screw nut. In this case, the steering actuator 16 assists a movement of the steering rack with a driving force thereof. A driver steering torque sensor 44 for detecting a driver steering torque of the user may be provided on the steering shaft 18. The steering actuator 16 generates a steering torque whose value is instructed based on a target trace line, as described hereinafter. With this arrangement, it becomes possible to generate the steering torque for keeping in the lane (for the departure prevention, for example).

The brake actuator 17 is connected to wheel cylinders 19 (referred to as wheel cylinders FL through RR, hereinafter) which are provided in the respective wheels. In order to independently control a braking pressure on a wheel basis, the brake actuator 17 adjusts the degree of opening of solenoid valves disposed in fluid channels for brake fluid to control wheel cylinder pressures of the wheel cylinders FL through RR. With this arrangement, it is possible to apply an arbitrary yaw moment to the vehicle body. With this arrangement, it becomes possible to generated a braking force (and thus a yaw rate) for keeping in the lane (for the departure prevention, for example).

The controller 15 may be formed by a single or a plurality of electronic control units. The controller 15 includes a microcomputer 152, an input circuit 151 and an output circuit 153, for example. In this case, functions described hereinafter are implemented when a CPU of the microcomputer 152 executes programs.

The controller 15 performs the lane keeping assist control based on road information. The lane keeping assist control includes an alert control via an information output device such as the buzzer 40 or the meter 42, and an intervention control for changing an orientation of the vehicle via the steering actuator 16 and the brake actuator 17.

The alert control may be implemented in various manners. For example, an alarm output condition of the alert control may be the same as an execution condition of the lane keeping assist control. Alternatively, the alarm output condition of the alert control may be different from the operation condition of the lane keeping assist control described hereinafter. For example, the intervention control may be performed before the wheel of the vehicle is on the lane boundary sign, while the alert control may be performed when the wheel of the vehicle is on the lane boundary sign. Further, the output manner of the alert is also arbitrary. The alert may be a visual alert displayed on the meter 42, an acoustic alert output by the buzzer 40, a vibration, or any combination thereof.

The intervention control may be implemented in various manners. For example, the intervention control may be the same as a LKA (Lane Keeping Assist) that supports a driver's steering operation such that the vehicle travels to keep the traveling lane, or a LDW (Lane Departure Warning) that is operated when the departure from the traveling lane is detected or the like. According to the LKA, the steering torque and the braking force are always assisted according to the lateral displacement with respect to the target traveling line (traveling lane center), the yaw angle, etc., and, when the departure tendency is detected, the departure reduction with the steering torque or the yaw moment is performed. According to the LDW, when the departure tendency is detected, the departure reduction with the steering torque or the yaw moment is performed. It is noted that at the time of the intervention control both of or any one of the steering torque or the yaw moment may be generated.

FIG. 2 (A) is an example of a block diagram of the controller 15 when it performs the intervention control with the steering torque (steering force), and FIG. 2 (B) is an example of a block diagram of the controller 15 when it performs the intervention control with the braking force.

In the example illustrated in FIG. 2 (A), the controller 15 includes a departure determining part 21, a target trace line generating part 22, a target lateral acceleration calculating part 23 and a target steering torque calculating part 24.

The departure determining part 21 determines whether the vehicle departs from the traveling lane. The departure determination may be implemented by any method. For example, a departure prediction time is calculated based on the lateral displacement X of the vehicle and detects the departure tendency (departure) if the departure prediction time becomes less than or equal to a threshold.

The target trace line generating part 22, if it is determined that the vehicle departs from the traveling lane, generates the target trace line for reducing the departure. The target trace line may include two lines of a first line and a second line. In this case, the first line is used for the departure reduction and the second line is used for modifying the direction of the vehicle after the departure reduction. The second line may be set substantially straight at the exit of the curve.

The target lateral acceleration calculating part 23, if it is determined that the vehicle departs from the traveling lane, calculates a target lateral acceleration such that the vehicle travels along the target trace line. For example, the target lateral acceleration may be calculated as follows.

Target lateral acceleration $Gx = G1 \times V^2 \times \beta + G2 \times \phi + G3 \times X$ G1 is a feed-forward operator (gain), G2 is a feed-back operator and G3 is a feed-back operator. It is noted that the described calculation method is just one example. The target lateral acceleration may be calculated from the lateral displacement X and the yaw angle φ only, or a speed is included in the feed-back term of the yaw angle φ. Further, as a simple example, the target lateral acceleration may be read from a map in which the target lateral acceleration Gx is associated with the lateral displacement X and the yaw angle φ.

The target steering torque calculating part 24 calculates a target steering torque according to the target lateral acceleration. For example, the target steering torque calculating part determines a gain K according to the vehicle speed, and calculates the target steering torque based on the target lateral acceleration and the gain K with the following formula.

Target steering torque $ST = K \times Gx$

The gain K is a function of the vehicle speed considering the fact that the steering torque need to trace the target trace line varies according to the vehicle speed.

In the example illustrated in FIG. 2 (B), the controller 15 includes a target braking pressure calculating part 25 instead of the target steering torque calculating part 24. The target braking pressure calculating part 25 calculates a target braking pressure according to the target lateral acceleration. For example, the target brake pressure calculating part 25 calculates a target brake torque based on the target lateral acceleration and the vehicle speed. Specifically, the target brake pressure calculating part 25 calculates a target cylinder pressure difference ΔPf of the front wheels and a target cylinder pressure difference ΔPr of the rear wheels based on the target lateral acceleration.

$\Delta Pf = 2 \times Cf \times (Gx - Th)/Tr$ $\Delta Pr = 2 \times Cr \times Gx/Tr$ Tr is a tread length, and Cf and Cr are conversion factors when the lateral acceleration is converted to the wheel cylinder pressure. Further, Th is a coefficient for making the target cylinder pressure difference ΔPf of the front wheels less than the target cylinder pressure difference ΔPr of the rear wheels. In the case of the outward departure, the target wheel cylinder pressure of the outward front wheel (front left wheel in the case of the left curve) is made greater than the target wheel cylinder pressure of the inward front wheel by the target cylinder pressure difference ΔPf, and the target wheel cylinder pressure of the outward rear wheel is made greater than the target wheel cylinder pressure of the inward rear wheel by the target cylinder pressure difference ΔPr. With this arrangement, the yaw moment is generated in the inward direction and the departure can be reduced. Further, in the case of the inward departure, the target wheel cylinder pressure of the outward front wheel (front right wheel in the case of the left curve) is made greater than the target wheel cylinder pressure of the inward front wheel by the target cylinder pressure difference ΔPf, and the target wheel cylinder pressure of the outward rear wheel is made greater than the target wheel cylinder pressure of the inward rear wheel by the target cylinder pressure difference ΔPr. With this arrangement, the yaw moment is generated in the outward direction and the departure can be reduced.

It is noted that the controller 15 may include both the target steering torque calculating part 24 and the target brake pressure calculating part 25. With this arrangement, the control can be performed by dividing the control amount for the departure reduction into the steering torque and the yaw moment.

FIG. 3 is a table for illustrating an example of a relationship between an operation mode of the controller 15 and abnormality determination results.

In the example illustrated in FIG. 3, an operation mode of the controller 15 has four types in general, and twelve types (4×3) in detail. Specifically, the operation mode includes an A-mode in which the alert control and the intervention control are executable; a B-mode in which only the intervention control, among the alert control and the intervention control, is executable; a C-mode in which only the alert control, among the alert control and the intervention control, is executable; and a D-mode in which the alert control and the intervention control are not executable (i.e., kept in a non-operated state).

During operating in the A-mode, the controller 15 performs the alert control when an alert output condition is met, and performs the intervention control when an execution condition of the intervention control is met. During operating in the B-mode, the controller 15 does not perform the alert control even when the alert output condition is met, but performs the intervention control when an execution condition of the intervention control is met. During operating in the C-mode, the controller 15 performs the alert control when the alert output condition is met, but does not perform the intervention control even when an execution condition of the intervention control is met. During operating in the D-mode, the controller 15 does not perform the alert control even when the alert output condition is met, and does not perform the intervention control even when an execution condition of the intervention control is met. It is noted that, while the controller 15 operates in the D-mode, the determinations of the alert output condition, etc., may be omitted, and processes for the lane keeping assist control may not be performed.

Initially, the A-mode, the B-mode, the C-mode and the D-mode may be selectable by the user. The mode may be selected or changed by the user at an arbitrary timing (when the user turns on the main switch 14, for example). Further, a predetermined mode (the A-mode, for example) may be selected as a default mode.

The A-mode, the B-mode, the C-mode and the D-mode each have three modes set according to the abnormality determination results. In the example illustrated in FIG. 3, the abnormality determination results each include a normal state and an abnormal state, and the abnormal state includes a first abnormal state and a second abnormal state. For example, in the C-mode, a CN-mode is set when the abnormality determination results indicate the normal state, a CI-mode is set when the abnormality determination results indicate the first abnormal state, and a CM-mode is set when the abnormality determination results indicate the second abnormal state. However, the CN-mode, the CI-mode and the CM-mode differ only in the abnormality determination result thereof, and are the same in a sense that they are the C-mode in which only the alert control, among the alert control and the intervention control, is executable. This holds true for other modes such as the A-mode, the B-mode and the D-mode. It is noted that, in the example illustrated in FIG. 3, twelve modes in total are set; however, there are modes (AI-mode, for example) that are not substantially used, and thus such modes may be omitted if appropriate.

The first abnormal state is not a permanently abnormal state but is not a normal state. For example, the first abnormal state is a transient abnormal state in which there is a possibility to return to the normal state. More specifically, the first abnormal state includes a high temperature state in which a temperature of a target part becomes higher than a predetermined threshold, a low voltage state in which a supply voltage for the target part becomes less than or equal to a predetermined threshold, and a short term poor communication state in which the communication with the target part is disabled less than or equal to a predetermined threshold period. This is because the high temperature state has a possibility to return to the normal state by stoppage of the operation or the cooling. The low voltage state has a possibility to return to the normal state by stoppage of other larger electric power consuming loads, charging the battery, etc. The short term poor communication state also has a possibility to return to the normal state when the grounds thereof such as noise disappear. On the other hand, the second abnormal state may be a permanently abnormal state that requires a repair. For example, the second abnormal state may include a failure of elements (a permanent failure), a communication disabled state in which the communication with the target part is disabled for more than the predetermined threshold period, etc.

As illustrated in FIG. 3, when the abnormality determination results indicate the normal state, the controller 15 operates in the mode selected by the user (or in the default mode). It is noted that the DN-mode is substantially the same as a state in which the main switch 14 is turned off, and thus may be omitted.

Figure 4:
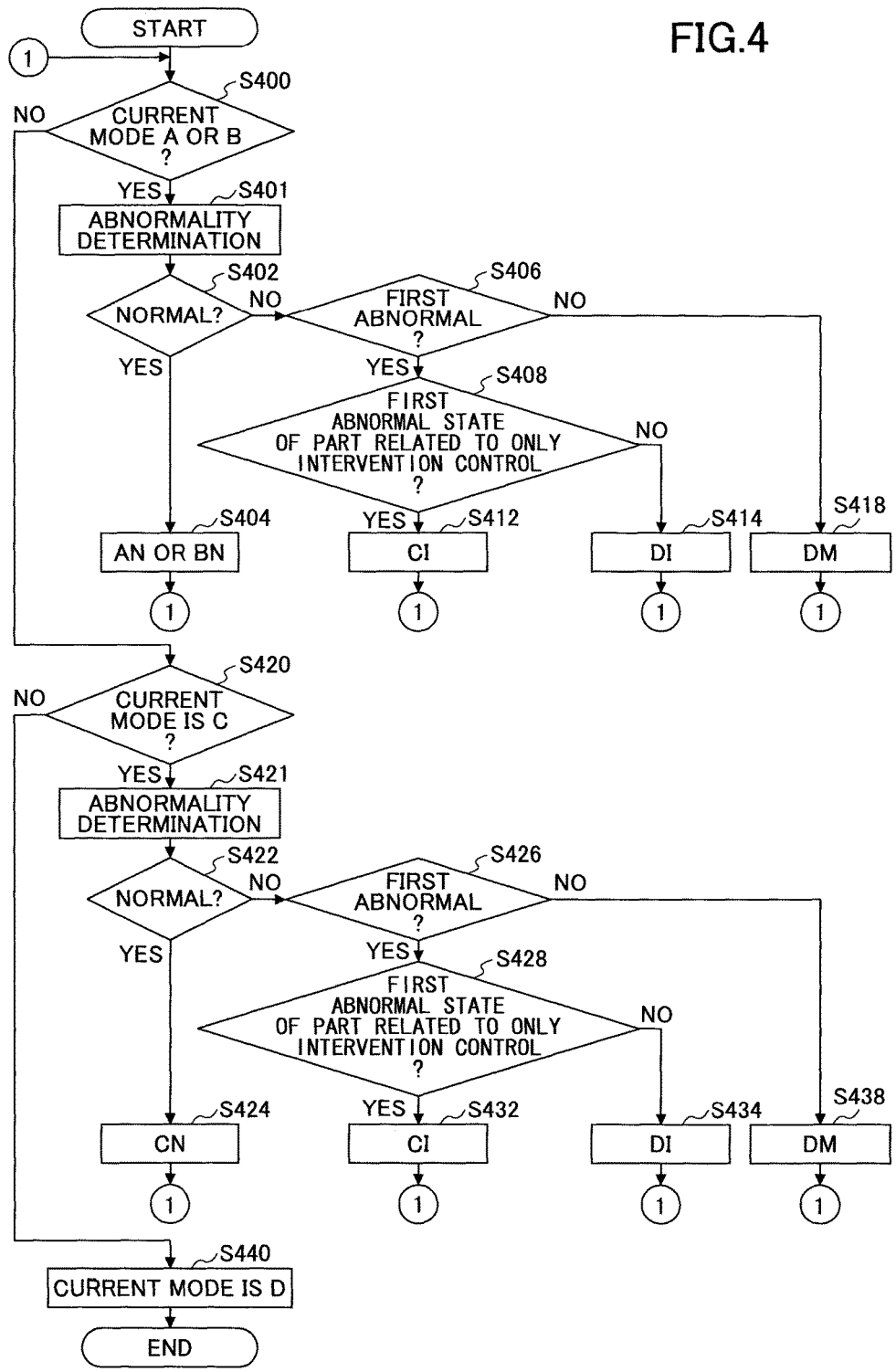
FIG. 4 is a flowchart for illustrating an example of an automatic mode transition process that may be executed by the controller 15.

FIG. 4 is a flowchart for illustrating an example of an automatic mode transition process executed by the controller 15. The process illustrated in FIG. 4 may be performed repeatedly every predetermined cycle, during an ON state of the main switch 14, for example.

In step 400, the controller 15 determines whether the current mode is the A-mode or the B-mode. If the current mode is the A-mode or the B-mode, the process goes to step 401, and otherwise (i.e., the current mode is the C-mode or the D-mode) the process goes to step 420.

In step 401, the controller 15 performs an abnormality determination process. The target parts to which the abnormality determination process is applied may include a part related to only the intervention control, and a part related to the intervention control and the alert control. The part related to only the intervention control may be an actuator (the steering actuator 16 and the brake actuator 17, for example) used for the intervention control. This is because the steering actuator 16 and the brake actuator 17 are not used for the alert control. The part related to the intervention control and the alert control may be the forward camera 11 and the white line recognition device 12, for example. This is because the road information derived by the white line recognition device 12 is used for the intervention control and the alert control.

In step 402, the controller 15 determines whether the abnormality determination results obtained in step 401 indicate the normal state. If the abnormality determination results indicate the normal state, the process goes to step 404, and otherwise (i.e., the abnormality determination results indicate the abnormal state) the process goes to step 406.

In step 404, the controller 15 keeps the current mode (the AN-mode or the BN-mode) and ends the process at this cycle. As a result of this, the mode transition is not performed.

In step 406, the controller 15 determines whether the abnormality determination results obtained in step 401 indicate the first abnormal state. If the abnormality determination results indicate the first abnormal state, the process goes to step 408, and otherwise (i.e., the abnormality determination results indicate the second abnormal state) the process goes to step 418. It is noted that if at least one of the abnormality determination results relating to the respective target parts indicates the first abnormal state, the process may go to step 408, and otherwise (i.e., there is no abnormality determination result that indicates the second abnormal state) the process may go to step 418.

In step 408, the controller 15 determines whether the abnormality determination results obtained in step 401 indicate the first abnormal state of the part related to only the intervention control. If the abnormality determination results obtained in step 401 indicate the first abnormal state of the part related to only the intervention control, the process goes to step 412, and otherwise (i.e., the abnormality determination results indicate the first abnormal state of the part related to the intervention control and the alert control) the process goes to step 414.

In step 412, the controller 15 changes the current mode (the AN-mode or the BN-mode) to the CI-mode and ends the process at this cycle. In this case, the controller 15 stores the mode after the change (i.e., the CI-mode), in addition to the intimal mode (the AN-mode or the BN-mode), in a predetermined storage part (EEPROM, for example), and then ends the process at this cycle to return to step 400. In this case, in the process at the next cycle, the determination result in step 400 is negative, to go to step 420 where the determination is affirmative.

In step 414, the controller 15 changes the current mode (the AN-mode or the BN-mode) to the DI-mode and ends the process at this cycle. In this case, the controller 15 stores the mode after the change (i.e., the DI-mode), in addition to the intimal mode (the AN-mode or the BN-mode), in the predetermined storage part, and then ends the process at this cycle to return to step 400. In this case, in the process at the next cycle, the determination result in step 400 is negative, to go to step 420 where the determination is negative, and then the process goes to step 440.

In step 418, the controller 15 changes the current mode (the AN-mode or the BN-mode) to the DM-mode and ends the process at this cycle. In this case, the controller 15 stores the mode after the change (i.e., the DM-mode), in addition to the intimal mode (the AN-mode or the BN-mode), in the predetermined storage part, and then ends the process at this cycle to return to step 400. In this case, in the process at the next cycle, the determination result in step 400 is negative to go to step 420 where the determination is negative, and then the process goes to step 440.

In step 420, the controller 15 determines whether the current mode is the C-mode. If the current mode is the C-mode, the process goes to step 421, and otherwise (i.e., the current mode is the D-mode) the process goes to step 440.

In step 421, the controller 15 performs the abnormality determination process. The abnormality determination process may be as described in connection with step 401.

In step 422, the controller 15 determines whether the abnormality determination results obtained in step 401 indicate the normal state. If the abnormality determination result indicates the normal state, the process goes to step 424, and otherwise (i.e., the abnormality determination result indicates the abnormal state) the process goes to step 426. Typically, the case where the abnormality determination result indicates the normal state corresponds to the case where the initial mode (the mode selected by the user or the default mode) is the C-mode.

In step 424, the controller 15 keeps the current mode (the CN-mode) and ends the process at this cycle. As a result of this, the mode transition is not performed.

In step 426, the controller 15 determines whether the abnormality determination result obtained in step 421 indicates the first abnormal state. If the abnormality determination result indicates the first abnormal state, the process goes to step 428, and otherwise (i.e., the abnormality determination result indicates the second abnormal state) the process goes to step 438. It is noted that if at least one of the abnormality determination results relating to the respective target parts indicates the second abnormal state, the process may go to step 438, otherwise the process may go to step 428.

In step 428, the controller 15 determines whether the abnormality determination result obtained in step 421 indicates the first abnormal state of the part related to only the intervention control. If the abnormality determination results obtained in step 401 indicate the first abnormal state of the part related to only the intervention control, the process goes to step 432, and otherwise (i.e., the abnormality determination results indicate the first abnormal state of the part related to the intervention control and the alert control) the process goes to step 434.

In step 432, the controller 15 changes the current mode (the CN-mode or the CI-mode) to the CI-mode (or keeps the CI-mode) and ends the process at this cycle. In this case, the controller 15 stores the mode after the change (i.e., the CI-mode), in addition to the intimal mode (the AN-mode, the BN-mode or the CN-mode), in the predetermined storage part, and then ends the process at this cycle to return to step 400. In this case, in the process at the next cycle, the determination result in step 400 is negative, to go to step 420 where the determination is affirmative.

In step 434, the controller 15 changes the current mode (the CN-mode or the CI-mode) to the DI-mode and ends the process at this cycle. In this case, the controller 15 stores the mode after the change (i.e., the DI-mode), in addition to the intimal mode (the AN-mode, the BN-mode or the CN-mode), in the predetermined storage part, and then ends the process at this cycle to return to step 400. In this case, in the process at the next cycle, the determination result in step 400 is negative, to go to step 420 where the determination is negative, and then the process goes to step 440.

In step 438, the controller 15 changes the current mode (the CN-mode or the CI-mode) to the DM-mode and ends the process at this cycle. In this case, the controller 15 stores the mode after the change (i.e., the DM-mode), in addition to the intimal mode (the AN-mode, the BN-mode or the CN-mode), in the predetermined storage part, and then ends the process at this cycle to return to step 400. In this case, in the process at the next cycle, the determination result in step 400 is negative, to go to step 420 where the determination is negative, and then the process goes to step 440.

In step 440, the controller 15 keeps the current mode (the D-mode) and ends the process at this cycle. In this case, the process does not return to step 400, and the process routine illustrated in FIG. 4 may end.

In this case, according to the process illustrated in FIG. 4, when the abnormality determination result indicates the first abnormal state related to the part related to only the intervention control, a state where the alert control is executable is kept (or formed). For example, it is assumed that the mode selected by the user (i.e., the initial mode) is the A-mode. In this case, when the abnormality determination result indicates the first abnormal state related to the part related to only the intervention control during the A-mode, only the intervention control is prevented and the state where the alert control is executable is kept. Further, it is assumed that the mode selected by the user (i.e., the initial mode) is the B-mode. In this case, when the abnormality determination result indicates the first abnormal state related to the part related to only the intervention control during the B-mode, only the intervention control is prevented and the state where the alert control is executable is formed. Further, it is assumed that the mode selected by the user (i.e., the initial mode) is the C-mode. In this case, when the abnormality determination result indicates the first abnormal state related to the part related to only the intervention control during the C-mode, the state where the alert control is executable is kept. With this arrangement, the lane keeping assist function is partially kept by the alert control, and thus safe driving of the vehicle can be kept.

It is noted that, in the example illustrated in FIG. 4, when the abnormality determination result indicates the second abnormal state related to the part related to only the intervention control during the A-mode or the B-mode, the mode changes to the D-mode (step 418); however, in this case, the mode may change to the C-mode, as is the case where the abnormality determination result indicates the first abnormal state related to the part related to only the intervention control. This is because, even in such a case, the state in which the alert control is executable can be kept on. Further, similarly, in the example illustrated in FIG. 4, when the abnormality determination result indicates the second abnormal state related to the part related to only the intervention control during the C-mode, the mode changes to the D-mode (step 438); however, in this case, the C-mode may be kept.

Further, in the example illustrated in FIG. 4, the abnormal state is detected such that the first abnormal state and the second abnormal state are distinguished; however, only whether the normal state or the abnormal state is detected may be determined without a distinction between the first abnormal state and the second abnormal state. In this case, when the abnormality determination result indicates the abnormal state related to the part related to only the intervention control during the A-mode or the B-mode, the mode may change to the C-mode. Further, when the abnormality determination result indicates the abnormal state related to the part related to only the intervention control during the C-mode, the C-mode may be kept.

Further, in the example illustrated in FIG. 4, when the abnormality determination result indicates the first abnormal state related to the part related to only the intervention control during the B-mode, the mode changes to the C-mode (step 412); however, in this case, the mode may change to the D-mode to consider the intention of the user (i.e., the initial mode) who initially does not desire the intervention control.

Figure 5:
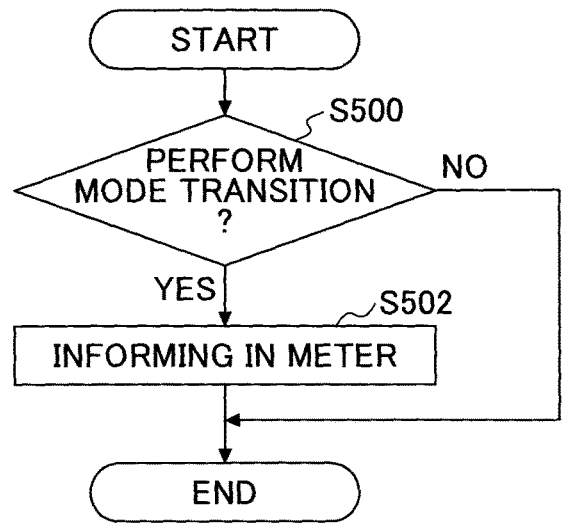
FIG. 5 is a flowchart for illustrating an example of an informing process at the time of the mode transition that may be executed by the controller 15.

FIG. 5 is a flowchart for illustrating an example of an informing process at the time of the mode transition that may be executed by the controller 15. It is noted that the informing process at the time of the mode transition is preferably performed, and may be omitted.

In step 500, the controller 15 determines whether the controller 15 performs the mode transition. The mode transition is performed according to the process illustrated in FIG. 4, for example. Specifically, when the controller 15 performs the process of step 412, step 414, step 418, step 434 or step 438, it is determined that the mode transition is performed, and the process goes to step 502. It is noted that when the controller 15 performs the process of step 432 illustrated in FIG. 4, it may be determined that the mode transition is not performed, because the C-mode is kept in this case. In other words, the mode transition determined in step 500 is related to the mode transition between the A-mode, the B-mode, the C-mode and the D-mode, and thus may not include the mode transition within the C-mode (the mode transition from the CN-mode to the CI-mode, for example), for example.

In step 502, the controller 15 outputs information in the meter 42 for informing that the mode transition has been performed (performs the informing process). With this arrangement, the user can understand that the mode transition has been performed. It is noted that the informing process may involve outputting information about the reason why the mode transition has been performed. For example, when the mode is changed from the A-mode to the C-mode by step 412 illustrated in FIG. 4, such a display informing that "the mode is changed from the A-mode to the C-mode because of a temporary abnormality of the steering actuator" may be output.

Figure 6:
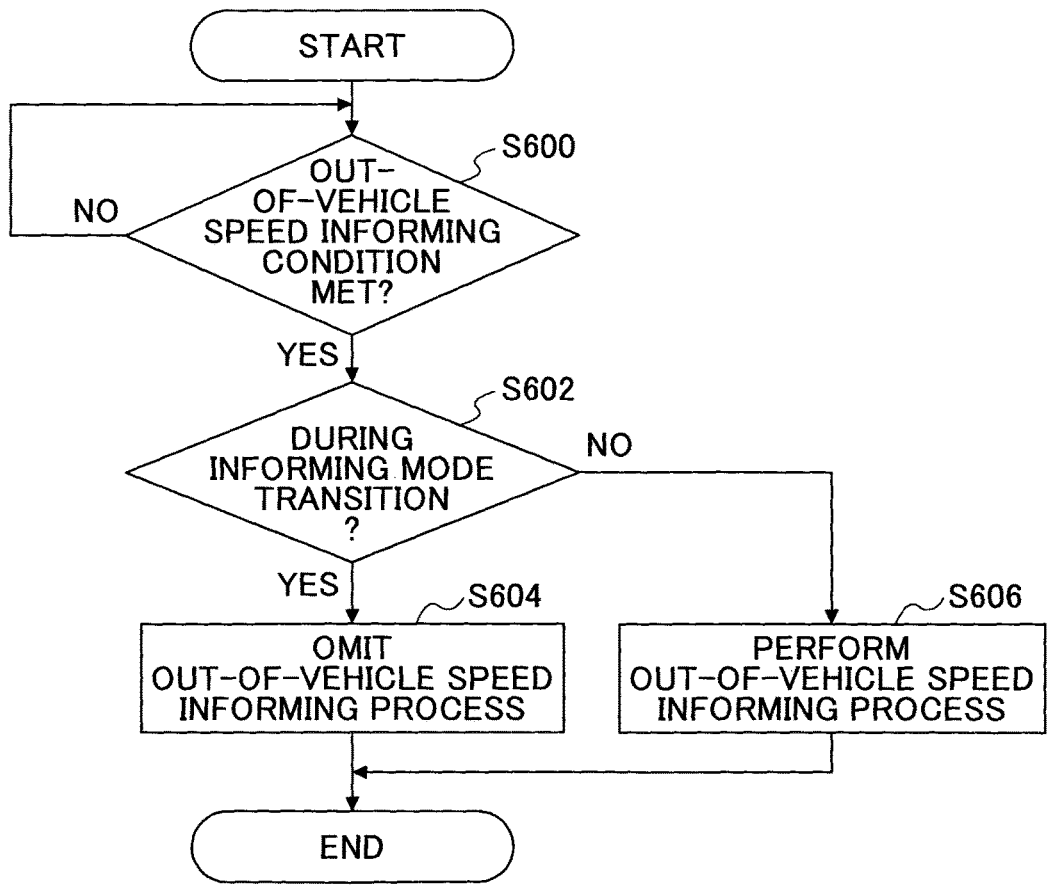
FIG. 6 is a flowchart for illustrating an example of out-of-operation vehicle speed informing process executed by the controller 15.

FIG. 6 is a flowchart for illustrating an example of an out-of-operation vehicle speed informing process executed by the controller 15. The process illustrated in FIG. 6 is related to the process illustrated in FIG. 5, and may be performed repeatedly every predetermined cycle, during an ON state of the main switch 14.

In step 600, the controller 15 determines whether a predetermined out-of-operation vehicle speed informing condition is met. The predetermined out-of-operation vehicle speed informing condition may be set in any manner. For example, the lane keeping assist control is desired to be performed when the vehicle speed is within an appropriate vehicle speed range. Therefore, the predetermined out-of-operation vehicle speed informing condition may be met if a state where the vehicle speed is less than or equal to a predetermined lower limit vehicle speed continues for a predetermined time or a state where the vehicle speed is greater than or equal to a predetermined upper limit vehicle speed continues for the predetermined time. If the predetermined out-of-operation vehicle speed informing condition is met, the process goes to step 602, otherwise the process becomes a waiting state until the predetermined out-of-operation vehicle speed informing condition is met.

In step 602, the controller 15 determines whether the controller 15 is executing the informing process (mode transition informing process) of step 502 in FIG. 5. If the controller 15 is executing the informing process, the process goes to step 604 and otherwise (i.e., if the controller 15 is not executing the informing process) the process goes to step 606.

In step 604, the controller 15 does not execute the out-of-operation vehicle speed informing process (i.e., omits it). With this arrangement, it can be prevented to perform the out-of-operation vehicle speed informing process and the mode transition informing process simultaneously.

In step 606, the controller 15 performs the out-of-operation vehicle speed informing process via the meter 42. The out-of-operation vehicle speed informing process may be performed in any manner. For example, the out-of-operation vehicle speed informing process may be implemented by outputting, in the meter 42, information that indicates the reason, such as information that indicates that the lane keeping assist control is not performed due to the vehicle speed being out of a specified range. It is noted that the out-of-operation vehicle speed informing process may be omitted if it has already performed in the current trip.

According to the process illustrated in FIG. 6, if the timing for the out-of-operation vehicle speed informing process and the timing for the mode transition informing process are overlapped, only the mode transition informing process is performed, which can reduce irksome feeling of the user which otherwise the user would have when the both informing processes are performed. It is noted that the process of step 604 illustrated in FIG. 6 may be omitted if the user desires the constant output of the information by the out-of-operation vehicle speed informing process. Such an intention of the user may be input via a predetermined interface.

It is noted that, in the process illustrated in FIG. 6, the out-of-operation vehicle speed informing process is suppressed at the time of performing any mode transition informing process; however, the out-of-operation vehicle speed informing process may be suppressed at the time of performing a particular mode transition informing process. For example, the out-of-operation vehicle speed informing process may be suppressed only during informing the mode transition to the C-mode or the D-mode.

Figure 7:
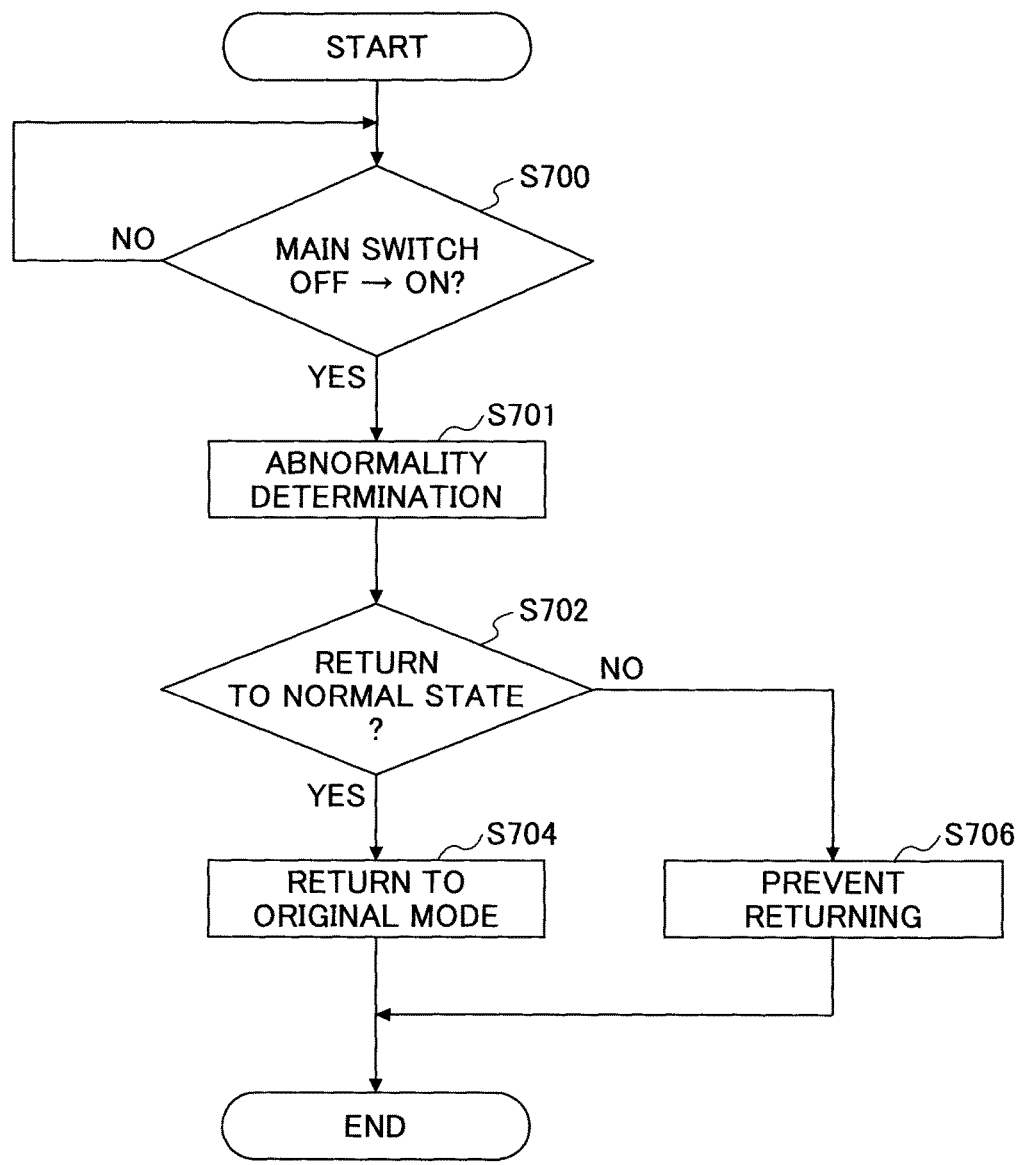
FIG. 7 is a flowchart for illustrating an example of a mode returning process executed by the controller 15.

FIG. 7 is a flowchart for illustrating an example of a mode returning process executed by the controller 15. The process illustrated in FIG. 7 may be performed after the mode transition (the mode transition from the A-mode or the B-mode to the C-mode or the D-mode, in particular) has been performed due to the abnormality determination result indicating the first abnormal state. For example, the process illustrated in FIG. 7 may be performed after the process of step 412, step 414 or step 434 has been performed. Further, the process illustrated in FIG. 7 may be performed in the trip during which the mode transition has been performed.

In step 700, the controller 15 determines whether the main switch is turned on from in its OFF state. It is noted that the premise for starting the process illustrated in FIG. 7 is that the mode transition has been performed due to the abnormality determination result indicating the first abnormal state. Such a mode transition is performed when the main switch is in its ON state (see FIG. 4). Thus, if the main switch is turned off by the user after the mode transition and then the main switch is turned on by the user, the determination result of step 700 becomes confirmative. If the main switch is turned on, the process goes to step 701 otherwise the process becomes a waiting state until the main switch is turned on.

In step 701, the controller 15 performs the abnormality determination process. The abnormality determination process may be as described in connection with step 401.

In step 702, the controller 15 determines whether the abnormality determination results indicate the normal state. If the abnormality determination results indicate the normal state (i.e., if the first abnormal state returns to the normal state), the process goes to step 704, and otherwise (i.e., if the first abnormal state is kept) the process goes to step 706.

In step 704, the operation mode is set to the original mode. In other words, the operation mode returns to the initial mode. It is noted that the original mode may be determined based on the information (described in connection with FIG. 4) stored in the predetermined storage part (EEPROM, for example). For example, if the mode transition from the A-mode to the C-mode is performed by step 412 in FIG. 4, the operation mode returns to the A-mode. Further, if the mode transition from the B-mode to the C-mode is performed by step 412 in FIG. 4, the operation mode returns to the B-mode. Further, if the mode transition from the A-mode to the D-mode is performed by step 414 in FIG. 4, the operation mode returns to the A-mode. Further, if the mode transition from the B-mode to the D-mode is performed by step 412 in FIG. 4, the operation mode returns to the B-mode. Further, if the mode transition from the C-mode to the D-mode is performed by step 434 in FIG. 4, the operation mode returns to the initial mode (the A-mode, the B-mode or the C-mode). It is noted that once the operation mode is set (determined), the process in FIG. 4 may be initiated to be performed repeatedly.

In step 706, the operation mode is set to the mode after the mode transition. In other words, the return to the original mode (i.e., the initial mode) is not performed (prevented). It is noted that the mode after the mode transition may be determined based on the information (described in connection with FIG. 4) stored in the predetermined storage part (EEPROM, for example). It is noted that once the operation mode is set (determined), the process in FIG. 4 may be initiated to be performed repeatedly.

As described above, because the first abnormal state may return to the normal state due to the lapsed time, etc., it is desirable to immediately return to the original mode in terms of safe driving of the vehicle when such a return is implemented. However, because the return to the original mode involves the execution (recovery) of the intervention control which is currently limited, it is desirable in terms of the characteristics of the intervention control to implement the return to the original mode after confirming the intention of the user.

In this point, according to the process illustrated in FIG. 7, the return condition is determined only when the user turns on the main switch from its OFF state after the mode transition has been performed due to the abnormality determination result indicating the first abnormal state. With this arrangement, turning on the main switch from its OFF state becomes a kind of the confirmation of the user's intention, and the return to the original mode can be implemented at appropriate timing. It is noted that for this purpose the user may be informed in advance that the return to the initial mode can be implemented by turning on the main switch from its OFF state (but the return to the normal state is necessary as a premise). Thus, for this reason, the mode transition informing process illustrated in FIG. 5, for example, may involve the output of such guidance.

It is noted that, in the example illustrated in FIG. 7, turning on the main switch from its OFF state is one of the conditions to be met for the mode return involving the recovery of the intervention control as well as the mode return (the return to the C-mode from the D-mode, for example) not involving the recovery of the intervention control. However, with respect to the mode return involving the recovery of the intervention control as well as the mode return (the return to the C-mode from the D-mode, for example) not involving the recovery of the intervention control, turning on the main switch from its OFF state may be not required. In other words, the determination process of step 700 may be omitted. This is because the alert control has less effect on the vehicle drivability with respect to the intervention control.

Further, the process illustrated in FIG. 7 is performed only after the mode transition has been performed due to the abnormality determination result indicating the first abnormal state, and is not performed after the mode transition has been performed due to the abnormality determination result indicating the second abnormal state. This is because in the case of the second abnormal state, unlike the case of the first abnormal state, it is unlikely to return to the normal state without a repair (including an exchange of parts). Further, this is because the fact that the abnormality determination result changes from the second abnormal state to the normal state in a single trip means the reduced reliability of the abnormality determination. In this way, according to the process illustrated in FIG. 7, the return condition to be met to return to the original mode from the mode after the mode transition differs between the case of the first abnormal state and the case of the second abnormal state, and thus the return to the initial mode can be limited appropriately. However, the process illustrated in FIG. 7 may be performed similarly after the mode transition has been performed due to the abnormality determination result indicating the second abnormal state.

It is noted that, in the process illustrated in FIG. 7, the mode set by the process of step 704 and step 706 may be informed to the user via the meter 42. With this arrangement, the user can confirm whether the return to the initial mode has been implemented.

It is noted that the process illustrated in FIG. 7 may be performed even when the main switch is turned on for the first time during a single trip (if the main switch is in its ON state when an ignition switch is turned on, for example). In this case, even if the mode transition has been performed due to the abnormality determination result indicating the second abnormal state during the previous trip, the return to the original mode can be implemented if the abnormality determination result returns to the normal state. With this arrangement, when the second abnormal state returns to the normal state due to the repair, the operation mode can return to the original mode without performing a specific process. It is noted that, even if the main switch is turned on for the first time during a single trip, the resultant set mode may be informed to the user via the meter 42. With this arrangement, the user can understand in which mode the lane keeping assist control is being performed. It is noted that the current mode may always be displayed in the meter 42.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention. Further, all or part of the components of the embodiments described above can be combined.

For example, in the embodiments described above, the informing processes are implemented by outputting various types of the information in the meter 42; however, such informing processes may be implemented via other display devices such as HUD (Head Up Display). Further, the informing processes may involve a voice message or may be replaced with the voice message.

Further, in the embodiments described above, the alert control is not executable (an example of the suppressing way) during the B-mode; however, during the B-mode, the alert control may be executable in a suppressed manner with respect to the A-mode. The suppressed manner may be implemented by reducing the frequency or volume of the alerts with respect to the A-mode, or changing the alert output condition such that it becomes more difficult to be met, for example. This holds true for the alert control during the D-mode.

Further, in the embodiments described above, the intervention control is not executable (an example of the suppressing way) during the C-mode; however, during the C-mode, the intervention control may be executable in a suppressed manner with respect to the A-mode. The suppressed manner may be implemented by reducing the operation frequency or the output of the actuator with respect to the A-mode, or changing the execution condition of the intervention control such that it becomes more difficult to be met, for example. This holds true for the intervention control during the D-mode.

Further, in the embodiments described above, a lane detecting part is implemented by the forward camera 11 and the white recognition device 12; however, the lane may be detected by another apparatus such as a magnetic sensor, if a special infrastructure is developed, for example.

Further, in the embodiments described above, the target parts of the abnormality determination process include the part related to only the intervention control and the part related to the intervention control and the alert control; however, the target parts of the abnormality determination process may include the part related to only the intervention control and the part related to the intervention control, a part related to only the alert control and the part related to the intervention control and the alert control. Alternatively, The target parts of the abnormality determination process may include the part related to only the alert control and the part related to the intervention control and the alert control. In this case, when the abnormality determination result indicates the abnormal state related to the part related to only the intervention control during the A-mode or the B-mode, the mode may be change to the C-mode.

Further, in the embodiments described above, the lane keeping assist function is turned on when the main switch 14 is turned on; however, the lane keeping assist function may be turned on in other manners. For example, the lane keeping assist function may be automatically turned on when a predetermined condition is met. In this case, the main switch 14 may be omitted. Further, the main switch 14 may form the previous ON/OFF state or a predetermined default state (OFF state, for example) when an ignition switch is turned on.

Further, in the example illustrated in FIG. 1, the lane keeping assist apparatus 100 includes the steering actuator 16 and the brake actuator 17; however, one of the steering actuator 16 and the brake actuator 17 may be omitted. For example, even in the case of a vehicle which includes the steering actuator 16 and the brake actuator 17, there may be a configuration in which only the brake actuator 17 is used for the intervention control and thus the steering actuator 16 is not used for the intervention control, and a configuration in which only the steering actuator 16 is used for the intervention control and thus the brake actuator 17 is not used for the intervention control. Similarly, in the example illustrated in FIG. 1, the lane keeping assist apparatus 100 includes the buzzer 40 and the meter 42; however, one of the buzzer 40 and the meter 42 may be omitted.

The present application is based on Japanese Priority Application No. 2013-151948, filed on Jul. 22, 2013, the entire contents of which are hereby incorporated by reference.

The invention claimed is:

1. A lane keeping assist apparatus comprising:
a lane detector that detects a lane in which a vehicle travels;
an information output device;
an actuator that generates a force for changing an orientation of the vehicle; and
a controller that performs a lane keeping assist control based on a positional relationship between the lane detected by the lane detector and the vehicle under a situation where a lane keeping assist function is in an ON state, the lane keeping assist control including an alert control that outputs an alert via the information output device and an intervention control that changes the orientation of the vehicle via the force generated by the actuator, the controller being configured to:
determine whether a part related to the alert control or a part related to the intervention control is functioning in an abnormal state, the abnormal state indicating an abnormality exists in functioning of the alert control or the intervention control;
selectively operate in a first mode where the alert control and the intervention control are executable, a second mode where only the alert control is executable, or a third mode where the alert control and the intervention control are suppressed, the controller selectively operating in the second mode or the third mode based on determining that the abnormality exists in the part related to the alert control or the part related to the intervention control; and
during operation in the first mode, perform a mode transition to the second mode responsive to determining that the abnormality exists in only the part related to the intervention control.

2. The lane keeping assist apparatus of claim 1, wherein the controller, during operating in the second mode, continues operating in the second mode in response to the abnormality determination results indicating the abnormal state of only the part related to the intervention control.

3. The lane keeping assist apparatus of claim 1, wherein:
the abnormal state includes a first abnormal state and a second abnormal state, the first abnormal state being transient and being capable of changing to a normal state, and the second abnormal state requiring a repair, and
during operating in the first mode, the controller performs a mode transition to the third mode in response to the abnormality determination results indicating the second abnormal state of only the part related to the intervention control, and the controller performs a mode transition to the second mode in response to the abnormality determination results indicating the first abnormal state of only the part related to the intervention control.

4. The lane keeping assist apparatus of claim 3, wherein, during operating in the first mode, the controller performs a mode transition to the third mode in response to the abnormality determination results indicating the first abnormal state of the part related to the intervention control and the part related to the alert control.

5. The lane keeping assist apparatus of claim 4, wherein, during operating in the second mode, the controller performs a mode transition to the third mode in response to the abnormality determination results indicating the second abnormal state of only the part related to the intervention control, and the controller continues operating in the second mode in response to the abnormality determination results indicating the first abnormal state of only the part related to the intervention control.

6. The lane keeping assist apparatus claim 3, wherein, after the controller has performed a mode transition due to the abnormality determination result indicating the first or second abnormal state, the controller performs a mode transition to an original mode before the mode transition in response to the lane keeping assist function being changed to the ON state from an OFF state and the abnormality determination result, which is obtained first after the lane keeping assist function is changed to the ON state, indicates a normal state.

7. The lane keeping assist apparatus claim 3, wherein, during a trip in which the controller has performed a mode transition due to the abnormality determination result indicating the first abnormal state, the controller performs a mode transition to an original mode before the mode transition in response to the lane keeping assist function being changed to an ON state from the OFF state and the abnormality determination result, which is obtained first after the lane keeping assist function is changed to the ON state, indicates a normal state.

8. The lane keeping assist apparatus claim 1, wherein:
the controller selectively operates in the first mode, the second mode, the third mode, and a fourth mode, in the fourth mode only the alert control, among the alert control and the intervention control, is suppressed, and
the controller, during operating in the fourth mode, performs a mode transition to the second mode in response to the abnormality determination results indicating the abnormal state of only the part related to the intervention control.

9. The lane keeping assist apparatus claim 1, wherein in response to the controller performing the mode transition, the controller outputs information indicating the mode transition via the information output device.

10. The lane keeping assist apparatus of claim 9, wherein:
in response to a vehicle speed being out of a predetermined range, the controller stops the lane keeping assist control and outputs information indicating that the lane keeping assist control is stopped due to the vehicle speed via the information output device, and
in response to the controller outputting the information indicating the mode transition, the controller suppresses the output of the information indicating that the lane keeping assist control is stopped due to the vehicle speed.

11. A lane keeping assist apparatus comprising:
a lane detector that detects a lane in which a vehicle travels;
an information output device;
an actuator that generates a force for changing an orientation of the vehicle; and
a controller that performs a lane keeping assist control based on a positional relationship between the lane detected by the lane detector and the vehicle under a situation where a lane keeping assist function is in an ON state, the lane keeping assist control including an alert control that outputs an alert via the information output device and an intervention control that changes the orientation of the vehicle via the force generated by the actuator, the controller being configured to: (i) determine whether a part related to the alert control or a part related to the intervention control is functioning in an abnormal state, the abnormal state indicating an abnormality exists in functioning of the alert control or the intervention control, and (ii) perform a mode transition between modes according to an abnormality determination result about a part related to the alert control and a part related to the intervention control based on determining that the abnormality exists, wherein:
the modes include a first mode where the alert control and the intervention control are executable, a second mode where only the intervention control is suppressed, and a third mode where the alert control and the intervention control are suppressed,
an abnormal state indicated by the abnormality determination result includes a first abnormal state and a second abnormal state, the first abnormal state being transient and being capable of changing to a normal state, and the second abnormal state requiring a repair, and
a return condition to be satisfied to change to an original mode from a mode after the mode transition is one of: (i) the abnormality determination results indicating the first abnormal state, and (ii) the abnormality determination results indicating the second abnormal state, such that the return condition is more strict to be met where the abnormality determination results indicate the second abnormal state than where the abnormality determination results indicate the first abnormal state.

* * * * *